United States Patent

Hornung

[15] 3,668,651

[45] June 6, 1972

[54] WORKING DEVICE CODE METHOD OF I/O CONTROL

[72] Inventor: Louis Michael Hornung, Austin, Tex.

[73] Assignee: International Business Machines Corporation, Armonk, N.Y.

[22] Filed: Dec. 30, 1970

[21] Appl. No.: 102,685

[52] U.S. Cl. ....................340/172.5

[51] Int. Cl. ....................G06f 3/04

[58] Field of Search ....................340/172.5

[56] References Cited

UNITED STATES PATENTS

| | | | |
|---|---|---|---|
| 3,559,187 | 1/1971 | Figueroa et al. | 340/172.5 |
| 3,539,998 | 11/1970 | Belcher et al. | 340/172.5 |
| 3,432,813 | 3/1969 | Annunziata et al. | 340/172.5 |
| 3,411,143 | 11/1968 | Beausoleil et al. | 340/172.5 |
| 3,372,378 | 3/1968 | Devore et al. | 340/172.5 |

*Primary Examiner*—Paul J. Henon
*Assistant Examiner*—Ronald F. Chapurah
*Attorney*—Hanifin and Jancin and J. L. Jackson

[57] ABSTRACT

A technique of I/O control in which each of the devices in the system has a unique actual device code which is used during an input and output instruction execution. The I/O instruction instead of containing the actual code of the device will contain a working device code. For purposes of illustration in a thirty-two device system, a three-bit working device code is used instead of the five bit actual device code. During execution of an I/O instruction the three-bit working device code is used to address a portion of memory in which the actual device codes are stored. The actual device code associated with the working device code is then output both to a decoder to cause selection of an associated input/output address register and along the device code buss to the I/O devices. A comparison is made between the local actual device code wired into each I/O device and the transmitted code to determine which I/O device has been selected. The function to be performed as defined by the I/O instruction is stored in the selected I/O device. During subsequent interrupts each I/O device will activate its own interrupt line and a matrix is employed to determine which of the I/O devices simultaneously requesting service is of highest priority. The output of the matrix is then used to address the input/output address register store to obtain the address in memory which is associated with the particular device selected. In addition, the output of the matrix is applied to a device code encoder which provides a five-bit device code to the device code buss. This code is broadcast to the I/O devices so that the devices can determine by means of a comparison of the transmitted device code with its local stored device code, which device is to be interrupt serviced.

Overlap operation of all thirty-two I/O devices can be accomplished through use of the working device code technique under control of the supervisory program which selectively loads different actual device codes into the actual device code store in a manner such that for one operation a working device code will be associated with a first I/O device and during subsequent operations be associated with different I/O devices in accordance with the actual device code stored in the actual device code store by the supervisory program. Program sharing can thus be accomplished by switching of actual device codes associated with a given working device code in the actual device code store.

13 Claims, 7 Drawing Figures

INVENTOR
LOUIS M HORNUNG

ATTORNEY

I/O INSTRUCTION FORMAT:

| OP CODE | FUNCTION | WDC | REG ADDR |
|---|---|---|---|
| 0 0 1 1 | 4 BITS | 3 BITS | 5 BITS |

FIG. 3a

REGISTER ARITHMETIC FORMAT:

| OP CODE | FUNCTION | Q REG ADDR | P REG ADDR |
|---|---|---|---|
| 0 0 0 1 | 2 BITS | 5 BITS | 5 BITS |

FIG. 3b

| LINE | PRIORITY | DEVICE CODE | $DV_5$ | $DV_4$ | $DV_3$ | $DV_2$ | $DV_1$ |
|---|---|---|---|---|---|---|---|
| $IRR_1$ | HIGHEST | 0 | 0 | 0 | 0 | 0 | 0 |
| $IRR_2$ | | 1 | 0 | 0 | 0 | 0 | 1 |
| $IRR_3$ | | 2 | 0 | 0 | 0 | 1 | 0 |
| $IRR_4$ | | 3 | 0 | 0 | 0 | 1 | 1 |
| $IRR_5$ | | 4 | 0 | 0 | 1 | 0 | 0 |
| $IRR_6$ | | 5 | 0 | 0 | 1 | 0 | 1 |
| $IRR_7$ | | 6 | 0 | 0 | 1 | 1 | 0 |
| $IRR_8$ | | 7 | 0 | 0 | 1 | 1 | 1 |
| $IRR_9$ | | 8 | 0 | 1 | 0 | 0 | 0 |
| $IRR_{10}$ | | 9 | 0 | 1 | 0 | 0 | 1 |
| $IRR_{11}$ | | 10 | 0 | 1 | 0 | 1 | 0 |
| $IRR_{12}$ | | 11 | 0 | 1 | 0 | 1 | 1 |
| • | | • | • | • | • | • | • |
| • | | • | • | • | • | • | • |
| • | | • | • | • | • | • | • |
| $IRR_{32}$ | LOWEST | 31 | 1 | 1 | 1 | | |

WORKING DEVICE CODE METHOD OF I/O CONTROL

CROSS REFERENCE TO RELATED APPLICATION

The Diminished Matrix Method of I/O Control, by Louis M. Hornung, Ser. No. 102,740, filed 12/30/70.

BACKGROUND OF THE INVENTION

Field of Invention

The present invention relates to I/O control in general, and more particularly to an indirect addressing technique for I/O control which facilitates program sharing such that a single program can be utilized by identical I/O devices in a program sharing manner.

With the event of large scale processors and a tendency towards wide spread use of terminals and multiple I/O's, I/O control has become increasingly more important. Several methods of allowing I/O devices to cycle steal interrupt are available. The first employs a search ring in which control is stepped around sequentially from device to device with devices requesting service by seizing control when allowed to do so. When a device requires service, an identification code must be transmitted to the processor to identify which device has requested service. The processor can by means of, this identification code locate the appropriate input/output address register and proceed to process the interrupt request. Data from the processor can then be output along the data buss to the I/O device or data from the I/O device can then be input to the processor. All of this can be accomplished when using the search ring method through conventional addressing of the I/O devices by specific identifiers in the I/O instruction. However, the search ring technique in its true form does not provide an adequate priority interrupt scheme for high performance I/O devices, nor does it provide minimum reaction time. Priority interrupts are desirable since, assuming a variety of I/O devices, certain devices will require servicing at a much more rapid rate than other devices.

One well known technique for providing priority type interrupts is that of the matrix control method. In the matrix control method each device has associated with it an interrupt line which when it requires servicing it activates. Combination logic in the matrix determines which of the devices requesting service is of the highest priority and the processor then proceeds to process the interrupt. One of the problems associated with a priority type of interrupt scheme is that the device which is of highest priority, must be made aware that it is the selected device. A common technique for accomplishing this is to transmit a unique identifier code out to the devices. The devices then compare the unique identifier code with their own codes to determine which is the selected device. This identifier may be the same during the interrupt as used in the execution of an I/O instruction to activate the device. Assuming a 32-terminal configuration, the I/O instruction then must have a five-bit device code field. In a system with a 32 I/O device capability, this five-bit field must be reserved regardless of whether there are two or 32 devices actually attached. To maximize the capabilities of the instruction repertoire for a given word length it is obviously desirable that the length of the device code field in the I/O instruction be held to a minimum.

BRIEF DESCRIPTION OF THE DRAWINGS

FIGS. 3*a* and 3*b* illustrate the I/O instruction format and a two address register arithmetic format which can be used in a matrix type I/O system employing the working device code method which is the subject of the present invention;

BRIEF SUMMARY OF INVENTION

Figure 1:
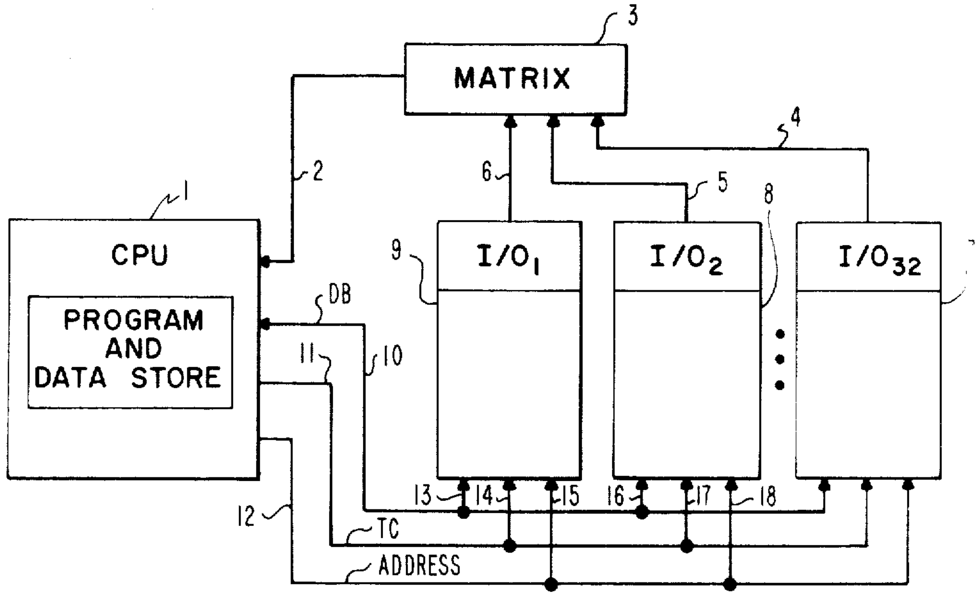
FIG. 1 is an overall diagram illustrating a matrix type hook up of a CPU and associated I/O devices.

Briefly, there is provided a system and technique of I/O control is which each of the devices in the system has a unique actual device code which is used to identify a particular device attached to the system among a plurality of devices during an input and output instruction execution and also during cycle steal servicing. The I/O instruction instead of containing the actual code of the device will contain a working device code. For a 32-device system, a three-bit working device code may be used instead of the five-bit actual device code. During execution of an I/O instruction the three-bit working device code is used to address a specific location in an implied portion of memory in which the actual device codes are stored. The actual device code associated with the working device code is then output both to a decoder to cause selection of an associated input/output address register and along the device code buss to the I/O devices. The address of memory to which or from which data is to be transferred during a subsequent cycle-steal interrupt is transferred into the selected input/output address register. Within each attached device a comparison is made between the local actual device code wired into each device and the code transmitted on the device code buss to determine if it is the device which has been selected. The function to be performed as specified by the I/O instruction is stored in the selected I/O device. During subsequent interrupts each I/O device which has been activated by an I/O instruction will activate its own interrupt line. A matrix is employed to determine which of the requesting I/O devices is of highest priority. The output of the matrix is used to address the input/output address register store to obtain the address in memory which is associated with the particular device selected. In addition, the output of the matrix is applied to a device code encoder which provides a five-bit device code to the device buss so that the particular device selected is signaled. The device detects its selection by means of a comparison of the transmitted device code with its local stored device code. During each interrupt the contents of the input/output address register is indexed in order that a sequence of consecutive addresses may be attained for a series of interrupts pertaining to a particular device.

Overlap operation of all 32 I/O devices can be accomplished through use of the working device code technique under control of the supervisory program which selectively loads different actual device codes into the actual device code store in a manner such that for one operation a working device code will be associated with a first I/O device and during subsequent operations be associated with different I/O devices in accordance with the actual device code stored in the actual device code stored by the supervisory program. Program sharing can thus be accomplished by switching of actual device codes associated with a given working device code in the actual device code store.

No unusual hardware structuring of the CPU to accomodate the working device code technique is required since the same addressing means via the memory address register is used to select a memory address during both I/O instruction execution and the other processing commands. Furthermore, the I/O instruction can be formatted in such a way that the working device code field in the instruction occupies the same bit positions as one of the address fields in a two address instruction format. Thus, no additional data paths are necessary in order to transfer the working device code to the memory address register.

DETAILED DESCRIPTION OF THE DRAWINGS

Refer first to FIG. 1, which is an overall block diagram, illustrating a central processing unit with associated I/O devices attached to it in a star or spokewheel configuration with a matrix type of priority interrupt selection. In a star configuration each device is attached directly to the processor as distinguished from a tandem hookup in which devices are connected thru each other to the processor. The CPU 1 has a stored program and further includes a data store. This type of CPU is well-known and only the parts of the CPU which are essential to an understanding of the present invention will be discussed. A number of I/O devices 7, 8, and 9 are shown connected to the CPU 1. I/O device 7 is connected by means of data buss 10 to the CPU while I/O devices 8 and 9 are connected by means of lines 16 and 13 respectively to the data buss 10. In addition, I/O device 7 is connected to the CPU by the timing and control line 11 while devices 8 and 9 are connected by means of lines 17 and 14 to the timing and control buss 11 and hence to the CPU. Further as shown, an address buss is connected to I/O device 7 and address line 12 and to I/O devices 8 and 9, respectively, by lines 18 and 15 with the address line being connected to the CPU 1. Each of the I/O devices 7–9 are connected by means of lines 4–6 to a matrix 3. Lines 4–6 are interrupt request lines which are applied to the matrix 3 which provides an output in accordance with which of the I/O devices is of highest priority. An indication as to the highest priority I/O device requesting service is provided along line 2 to the central processing unit 1. The central processing unit 1 then along line 12 outputs the address identifier of the selected I/O device along line 12 such that the device which has been selected is activated.

Figure 2:
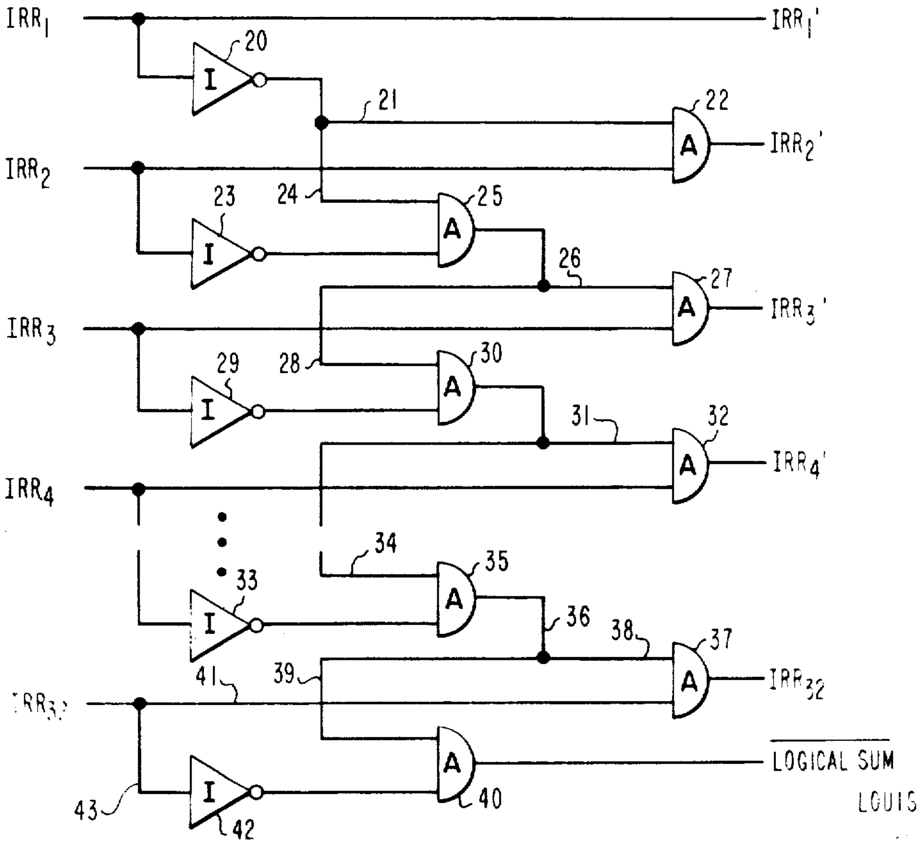
FIG. 2 is a detailed logical diagram of the matrix of FIG. 1.

Refer next to FIG. 2, which is a detailed logical diagram of the matrix of FIG. 1. As shown in FIG. 2, interrupt request lines $IRR_1$ through $IRR_{32}$ from the I/O devices constitute the input to the matrix while interrupt request line outputs $IRR_1'$ through $IRR_{32}'$ constitute the outputs of the matrix. Interrupt request line $IRR_1$ is the highest order priority line since it is connected straight through the matrix and appears as $IRR_1'$ while interrupt request line 32 is the lowest order priority. As shown in FIG. 2, interrupt request line $IRR_1$ is connected through inverter 20 along line 21 to AND gate 22 which also receives an input from $IRR_2$. The output of inverter 20 is also applied along line 24 to AND gate 25 which in turn receives the inverted $IRR_2$ signal through inverter 23. The output of AND gate 25 is applied along line 26 to AND gate 27 which is the AND output of $IRR_3$. AND gate 27 likewise receives an input from $IRR_3$. The output of AND gate 25 is also applied along line 28 to AND gate 30 which receives the inverted signal from $IRR_3$ through inverter 29. The output of AND gate 30 is applied along line 31 to AND gate 32 which also receives an input from $IRR_4$. This sequence of connections carries on through the final stage 32 as shown. Thus, inverter 33 applies an inverted signal from the previous higher priority order stage to AND gate 35 which also receives an input along line 34 from the previous higher priority order stage and provides an output along lines 36 and 38 to AND gate 37 which receives another input along line 41 from $IRR_{32}$. Connected also to $IRR_{32}$ along line 43 is an inverter 42 which applies its output to AND gate 40 which receives another input from AND gate 35 along line 39 to provide an inverted logical sum output. The inverted logical sum is merely a signal which indicates whether any of the interrupt request lines 1–32 are up. Thus when none of the devices are requesting service, the inverted logical sum figure will be up.

In the following description it will be assumed that a positive logical level applied to an interrupt request line indicates a request while a negative logical level indicates the absence of a request. Likewise, a positive logical level appearing at the output of the matrix will indicate that the associated line is of the highest order of priority. Further, the output of all of the AND gates will be at a negative logical level unless both inputs to the AND gate are positive.

As shown in FIG. 2 a positive level applied to $IRR_1$ will result in a positive level appearing at the output $IRR_1'$. All other matrix outputs must be negative except for the inverted logical sum output. This will be true regardless of whether other lower priority interrupt request lines have positive signals applied to them due to the interconnection of the inverters and AND gates from stage to stage. Thus, assume for purposes of illustration that positive signals are applied to both $IRR_1$ and $IRR_2$. The output from AND gate 22 which indicates that $IRR_2'$ is of the highest priority will be inhibited by the inversion of the positive signal applied to $IRR_1$ by inverter 20 since this will result in a negative signal being applied along line 21 to the input of AND gate 22. This negative signal from inverter 20 will likewise be applied along line 24 to the input of AND gate 25 which will cause it to likewise output a negative logical level. Further, the negative signal from AND gate 25 will likewise be applied to AND gate 30 to cause it to output a negative logical level. Thus, it can be seen that all of the AND gates 25–40 will have a negative input applied to them in the event that the signal from inverter 20 is negative. This is accomplished regardless of whether the associated interrupt request lines $IRR_2$–$IRR_{32}$ have a positive level applied to them.

On the other hand, assume now that $IRR_1$ has a negative signal applied to it which will, therefore, cause the output from inverter 20 to be positive such that if the signal applied to $IRR_2$ is positive the output from AND gate 22 will be positive. However, the output from inverter 23 will be at a negative logical level when $IRR_2$ is positive which will cause AND gate 25 to have a negative output and provide the same sort of inhibiting action as previously described. The same holds true throughout the matrix such that $IRR_{32}$ can only be selected when no higher order priority lines are selected.

Refer next to FIGS. 3*a* and 3*b*. In FIG. 3*a* is shown the instruction format for an I/O instruction while FIG. 3b shows the format of a arithmetic instruction. These formats are shown to facilitate a comparison between the two instructions. In particular it should be noted that the working device code field consists of bits in the same positions as the Q register address field. In either case these fields will be used to address memory. Thus, it will later become apparent that the I/O instruction can be handled in a manner similar to the arithmetic instruction and with the same registers and similar data paths such that there is no special purpose hardware involved.

Figure 4:
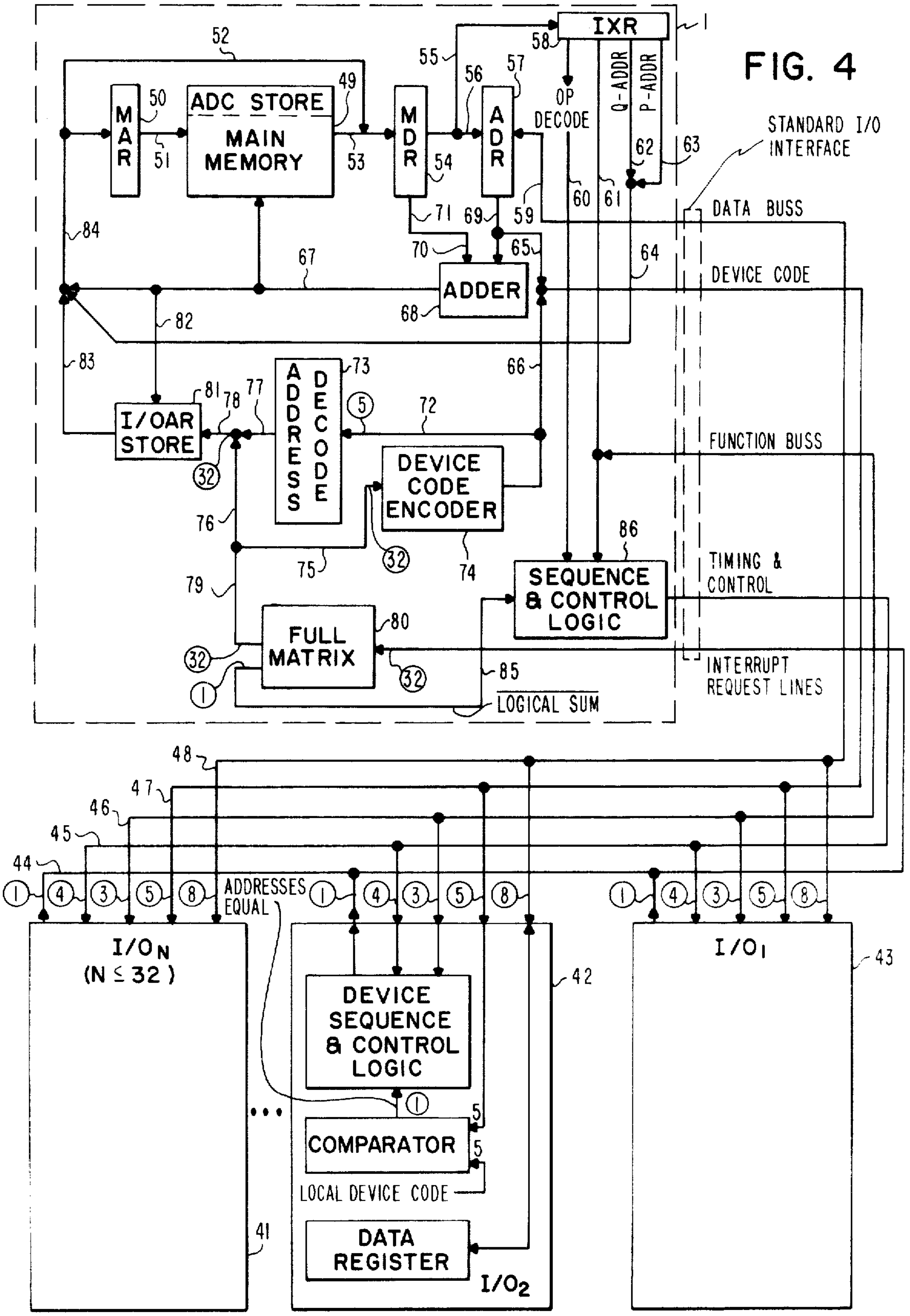
FIG. 4 is a detailed drawing of the CPU and I/O devices of FIG. 1.

For a more detailed description refer next to FIG. 4. In connection with the description of FIG. 4 the drawings have been simplified by using numeral notations in circles to indicate the number of lines in the various busses. Thus, the data buss 48 which is applied to the I/O devices has 8 lines; the device code buss 47 has 5 lines; the function buss 46 has 3 lines; the timing and control buss has 4 lines while each interrupt request line is a single line from each of the I/O devices.

As shown in FIG. 4 the CPU 1 is connected to a number of I/O devices by means of the busses. For purposes of illustration there are 32 I/O devices, 41–43 shown. Each of the I/O devices contains similar control logic for interfacing with the CPU. Thus, in each device there is a data register which stores data from the processor or stores data for transfer to the processor along the data buss line 48. Additionally, in each device there is a local device code or actual device code which hereinafter will be referred to as an actual device code. This is a unique code for each device and is wired into the device. The code used by a particular device must conform to the particular input to the matrix 80 utilized by the device so as to agree with the code produced by the encoder 74. Hence, the relative priorities of the various devices are determined by their various wired-in actual device codes. The actual device code is applied to a comparator which in addition receives an input along the device code buss 47 such that when a positive compare is made a signal is provided to the device sequence and control logic contained in the I/O device. The device sequence and control logic is the particular logic which is associated with the device and its makeup depends upon the type of device. The device sequence and control logic is connected to the function buss 46 such that the function dictated by the CPU (I/O instruction) can be stored in it. Additionally, it is connected to a timing control buss 45 and an interrupt request line 44 in a conventional manner. As above mentioned, each device has its own interrupt request line such that there are 32 interrupt request lines connected to the matrix which in FIG. 4 is shown in the CPU. The busses above discussed are conventional type busses and as mentioned the device sequence and control logic is included in block form since the particular makeup is not important with respect to the subject invention.

The CPU contains a memory address register 50, which is conventional, connected along line 51 to the main memory 49. The main memory 49 includes eight addresses which are reserved for the actual device code store. The working device code field of the I/O instructions specify the low order three-bits of the actual device code store with the high order bits being implied. The actual device code store is loaded as the control program is loaded. For many applications involving no more than eight devices the actual device code store is not changed after the initial loading. In program sharing applications, however, the actual device code store is loaded and changed dynamically under control of the supervisory program. As will later be discussed in more detail, there are eight locations in the actual device code store. Each of these eight locations may contain an actual device code and each of the eight is addressed by a unique working device code. To change the systems operation the supervisory program loads different actual device codes into the area such that a particular working device code can, under control of the supervisory program, address different actual devices to allow systems flexibility. In addition, as will later be discussed in more detail the actual device codes associated with the working device codes can be changed to allow program sharing so that numerous devices can share a common program in which a plurality of devices are addressed by a single I/O instruction (or a set of instructions) at different instants of time under control of the supervisory program.

The output of the main memory is applied along line 53 to the main data register 54 and its output is connected along line 56 to an alternate data register 57. The output from the main data register 54 can also be applied along line 55 to the instruction register 58 and along lines 70 and 71 to an adder 68. The output from the particular fields of the instruction register 56 are to an OP decode 60, the function buss 61, the Q address register 62 and the P address register 63. Referring again to FIGS. *3a* and *3b* it will be clear that for an I/O instruction the function which is applied to the function buss is 4 bits while during an arithmetic instruction the function applied to the sequence and control logic 86 is two bits in length. In addition it will be seen that the Q address field in the instruction is used for the working device code during the I/O instruction and is used in a conventional manner during an arithmetic instruction. In either instance the contents of the field are transferred to the memory address register for addressing memory. Although the size of the field is different in the two instances and the value of the implied high order bits, as is common in the processor art, the data flow paths are similar. Finally the P register is 5 bits in length for both the I/O instruction and arithmetic instruction.

The function buss line 61 is connected to the function buss 46 which is connected to each of the I/O devices. The Q address and P address portions of the instruction register which appear on lines 62 and 63 are applied to line 64 which in turn is connected to line 84 which is an input line to the memory address register.

An output from the alternate data register 57 is applied along line 69 to the adder 68. This in addition to the inputs from the main data register 54 allows conventional arithmetic operations to be performed between the two data registers. The output of the adder is then applied along line 67 into the main memory 49. Gating (not shown for reason of simplicity) under control of the sequence and control logic 86 allows the contents of either data register 54 or 57 to be passed through the adder 68 to line 67. This gating also provides for implied values such as "one" to be introduced for such purposes as indexing. The output from the alternate data register 57 is also applied along lines 69 and 65 to the device code buss 47. The device code buss 47 is also connected by means of line 66 to an address decode 73. The output of the decode address unit 73 is applied along line 77 and 78 to an I/OAR store 81. The I/OAR store 81 is simply a store which contains the address in memory to which or from which (depending whether an input or output operation has been specified) data is to be transferred with the specified I/O device. Each of the 32 I/O devices is provided a word in the I/OAR store 81 which is addressed by means of the actual device code. Thus as shown line 78 is actually 32 electrical lines in width and the I/OAR store will put out an address for each of the selected lines in accordance with the priority determined by the full matrix unit 80. The address stored in the I/OAR will be applied along lines 83 and 84 to the memory address register 50 during an interrupt and the contents of the I/OAR will be indexed by means of inputting to the adder 68 via lines 52 and 53, through the main data register 54, lines 71 and 70 to the adder, and from the adder back to the I/OAR via lines 67 and 82.

Further as shown in FIG. 4 the 32 interrupt request lines from the I/O devices are connected to a full matrix 80 which has a logical sum output applied along line 85 to the sequence and control logic 86 of the processor wherein a pending interrupt request is recognized. The matrix 85 also has a 32 line output represented by lines 76, 78 and 79 which is connected to the I/OAR store. The output lines from the full matrix 80 are also as shown applied along line 75 to a device code encoder 74. The device code encoder 74 provides a unique five-bit code along line 66 to the device code buss 47 so that all devices can determine if their interrupt request is being processed.

To facilitate an understanding of the subject invention an I/O instruction will first be described. First, the loading of a function into the I/O devices and then the interrupting by the devices to either receive data from the CPU or provide data to the CPU will be described. An I/O instruction is obtained from the memory unit 49 and passed along line 53 to the main data register 54 and then along line 55 and loaded into the instruction register 58. As shown in the format of the instruction word in FIG. 3a, an OP code field is provided which identifies that an I/O instruction is involved. The OP code is applied along line 60 to the sequence and control logic 86. Additionally, the particular function involved i.e., check status, test, etc. is applied along line 61 to the function buss 46. This function then is simultaneously applied to each of the I/O devices 41–43. While this function is applied to the function buss the portion of the instruction word which is in the Q address portion of the instruction register which is applied along lines 64 and 84 to the memory address register 50. As previously discussed there are eight working device codes each of which has associated with it an actual device code which is loaded by the supervisory program. At any given time, however, only one actual device code is associated with a working device code. The working device code is applied to the memory address register 50 and it addresses the portion of the memory to obtain the assigned actual device code. This actual code then is applied through main data register 54 along line 56 to the alternate data register 57 and thence along lines 65 and 69 to the device code buss 47 and is, therefore, applied simultaneously to all of the I/O devices. The actual device code is applied to the comparator of each of the I/O devices and a comparison is then made with the local device code of the I/O device. The I/O device having an identical code, then by means of the I/O device sequence and control logic, stores the function which at that time is being applied to the function buss. In a similar manner, the functions are loaded into the other I/O devices in the system. It should be noted that the I/O devices are not aware of the working device code which is assigned to them. They are uniquely identified by the five-bit local device code.

The primary purpose of the I/O instruction is to control the addressed device. The device may be activated for either the input or output of data to be read or written by means of its transducers. According to the nature of the device, a single byte or a block of data (multiple bytes from sequential addresses in main memory) may be specified to be input or output. Other functions of the device according to its nature may be specified, e.g. rewind or search in the case of magnetic tape. The instruction may also specify a test of status of the device. These functions are specified by the function field of the I/O instruction. Actual data in the way of input or output data is not transferred generally during the execution of the I/O instruction. This data is exchanged between main memory and the device during a subsequent interrupt which usually results from an I/O instruction being issued to the device. The interrupt may either be that known in the processor art as cycle-steal interrupt or a program interrupt which is equally well known in the art. The immediate embodiment as described herein utilizes the cycle steal technique; however, the invention is equally applicable and may be readily adapted by one skilled in the art to systems employing the program interrupt method. A device obtains an interrupt by initiating an interrupt request. Hereinafter, whenever the interrupt request of a device is acknowledged, the device will be said to be serviced.

When a device desires service, under control of the device sequence and control logic in the I/O device, it brings up its unique interrupt request line. As shown there are 32 interrupt request lines which are applied to the full matrix 80 in the CPU. The full matrix 80 then determines which device has highest priority and then brings up an output line corresponding to that device and this causes the I/OAR store 81 under control of the sequence and control logic 86 which received an indication that one or more devices is requesting service via line 85 from the matrix 80 to provide one of 32 addresses in memory which is to be worked with during execution of subsequent processing. A detailed description of the full matrix 80 was previously given in connection with FIG. 2. The output from the full matrix 80 which indicates which of the devices is to be serviced priority-wise is also applied to a device code encoder 74. This encoder then, based on which line has been selected, outputs a five-bit code along line 66 to the device code buss which is then applied to the devices. A code comparison is then made as previously described to indicate which device is the selected device. The device then proceeds to signal, via the function buss 46, the sequence and control logic 86 as to whether the interrupt is for the input or output of data. For most devices the kind of data transfer is specified by the previously issued I/O instruction to the device and is stored in the device. Also the device proceeds to transmit or receive data along the data buss 48. During execution of the I/O instruction as previously described the actual device code is output over the device code line 47 to select one of the I/O devices. This code, however, is also output along lines 66 and 72 to the address decode unit 73. The address decode unit 73 decodes the five-bit pattern and brings up one of the 32 lines into the I/OAR store 81 to select the particular input/output address register assigned to the five-bit code which will be the same register selected by the matrix 80 when an I/O device having the same five-bit pattern as its actual device code request interrupt service by means of its interrupt request line. Thus it is evident that it is necessary that the particular interrupt request line 44 used by a particular device be in accordance with the unique local device code which is wired in the device.

Figures 5, 6:
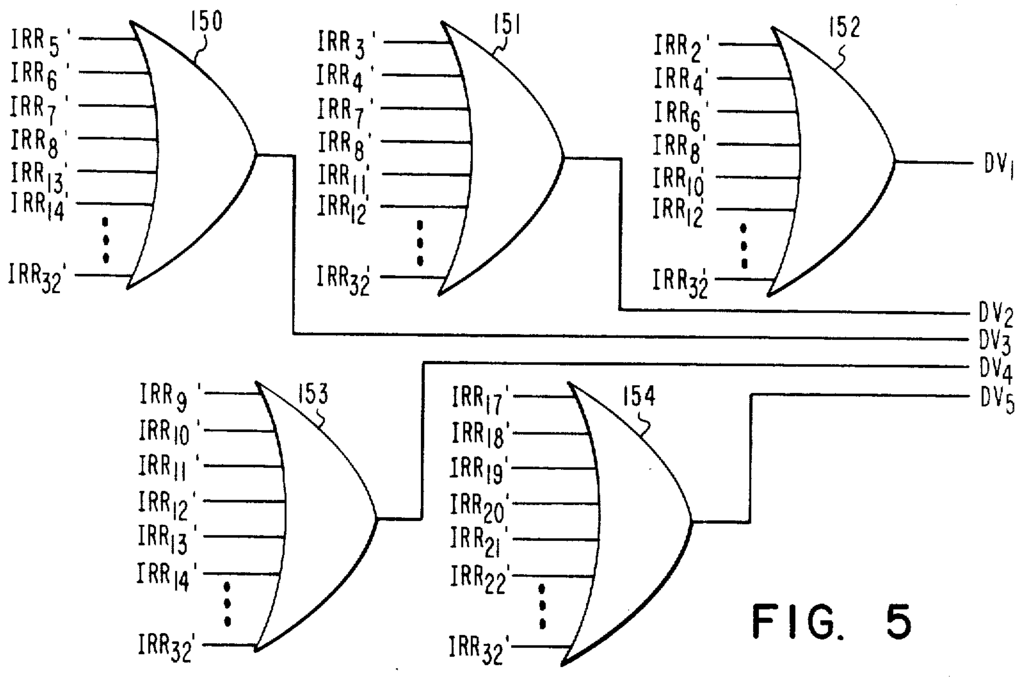
FIG. 5 is a logical diagram of the device code encoder of FIG. 4.
FIG. 6 is a truth table illustrating the operation of the device encoder of FIG. 5.

In FIG. 5 is shown a logical schematic of the address decode unit 73 while in FIG. 6 the truth table associated with the schematic of FIG. 5 is shown. In FIG. 6 in the column entitled "line" the designations IRR 1 through IRR 32 are shown. These designations correspond to the inputs to the matrix 80 of FIG. 4. The outputs of the matrix 80 of FIG. 4 are the lines IRR 1' through IRR 32' being brought up in accordance with the priority determined in the matrix. No more than one of these outputs may be true at any instant. In the nomenclature employed herein the output of the matrix is shown as a prime (negation not being intended). The lines coming out of the matrix 80 are tied to the inputs of the device code encoder 74 which is shown in FIG. 5.

Each of the logic blocks of FIG. 5 effects a logical OR of the inputs which are applied. Referring for example to IRR 32', $DV_1 - DV_5$ are at a positive logical level when IRR 32' is brought up. Further, as shown in FIG. 5 and the truth table of FIG. 6 a bit pattern of all zeros will result when IRR 1' is brought up. Likewise, a bit pattern in which all of the bits except $DV_1$ are 0 results whenever IRR 2' is brought up. In like fashion codes represented by unique bit patterns on lines $DV_1 - DV_5$ result from the selection of one of the output lines IRR 1' through IRR 32'.

To facilitate an appreciation that the subject working device code technique does not require modification to the usual processor an arithmetic instruction will briefly be described and compared to an I/O instruction. In the arithmetic instruction as shown by reference to FIG. **3*b* the function is two-bits in length as distinguished from the function in the I/O instruction field which is four-bits in length. The OP codes are the same length. In both instructions the OP code and the function are fed to the sequence and control logic 86 to control operation of the processor. The Q register address is five-bits in length and the P register address is five-bits in length in the arithmetic instruction. The Q register address in the arithmetic instruction is transferred to the memory address register 50 along lines 62, 64, and 84 and is used to select one of 32 general purpose registers which is located in main memory 49. The low order five-bits of the address of the register is specified by the Q address field of the instruction. The higher order bits of the address are implied to be zero. While in the I/O instruction the same field, which is three-bits in length, is used to address through the memory address register 50** one of eight words whose contents is one of 32 actual device codes. The actual device code is addressed in the same way as the contents of the Q register of the arithmetic instruction except for the size of the field in the instruction and in values of the implied high order bits of the instruction. The implied high order bits of the actual device code store may be all zeroes as they are for the general purpose registers in which case those particular words of memory may be addressed in either sense. Alternately, the high order bits may differ in value, e.g. all one's, wherein a separation in the usage of the involved words is attained. The choice of the values of the implied address bits depends on a number of highly subjective factors including the remainder of the instruction repertoire, the applications for which the design is intended, and the designers individual preference.

The similarities between the working device code field of the I/O instruction and the Q address field of the arithmetic instruction ends when the contents of the words addressed by these fields is obtained. The actual device code is used to select one of the input lines 78 to the I/OAR store 81 via the address decode 73. While, in the arithmetic instruction, the contents of the word addressed by the Q address field is stored in the alternate data register 57 until the contents of the register specified by the P address field is accessed in a similar manner to that addressed by the Q address and is stored in the main data register 54. Thus, the two operands specified by the Q and P address fields are supplied to the adder 68 from the two data registers 54 and 57 via lines 71, 70 and 69. From the above it can be seen that the operation of the Working Device Code and Q register address result in a similar type of operation with different field lengths being involved. Thus, there are no unusual nor additional data paths in the processor through utilization of the herein described working device code I/O control technique.

In summary, a system and technique of I/O control in which each of the devices in the system has a unique actual device code which is used during an input and output instruction execution and interrupts is provided. The I/O instruction instead of containing the actual code of the device contains a working device code. During execution of an I/O instruction a three bit working device code is used to address a portion of memory in which the assigned actual device codes are stored. The actual device code associated with the working device code is then output both to a decoder to cause selection of an associated input/output address register and along the device code buss to the I/O devices. A comparison is made between the unique local actual device code wired into each I/O device and the transmitted code to determine which I/O device has been selected. The function to be performed then by the I/O instruction is stored in the selected I/O device. During subsequent interrupts each I/O device requiring service activates its own interrupt line and a matrix is employed to determine which of the I/O devices is of highest priority. The output of the matrix is then used to address the input/output address register store to obtain the address in memory which is associated with the particular device selected. In addition, the output of the matrix is applied to a device code encoder which provides a five-bit device code to the device bus so that the particular device selected is signaled among several possible devices requesting service by means of a comparison of the transmitted device code with its local stored device code.

Not only does the above described technique of indirect addressing of I/O devices shorten the field in the instruction needed to select a device but in addition, overlap operation of all devices can be accomplished by use of the supervisory program to selectively load different actual device codes into the actual device code store in a manner such that for one operation a working device code will be associated with a first I/O device and during subsequent operations be associated with different I/O devices in accordance with the actual device code stored in the actual device code store by the supervisory program. Program sharing can thus be accomplished by switching of actual device codes associated with a given working device code in the actual device code store.

In the previous description the term program sharing is used to define a method by which two or more tasks are performed on a time sharing basis. The processing steps and decisions involved with each task is identical. The tasks are independent, however, involving different data and their own unique terminals or I/O devices. Since the tasks require identical processing they may be performed by similar programs — each program performing the control for one task. However, in program sharing the programs are not only similar but a single program is used to perform the plurality of tasks. Thus it may be said that there is not only a time sharing of the processor (hardware) but also a time sharing of the program (software).

The supervisory portion of the program is responsible for switching the attention of the program from one task to another. The supervisory program sets conditions in the processor so that the data concerned with one task is addressed at a particular time and that the data concerned with another task is addressed at another time. In unison with switching from the data of one task to that of another, the supervisory program must also cause the proper I/O devices to be addressed. The working device code method is ideally suited to program sharing applications. The device which is addressed at a particular time by a particular I/O instruction or set of instructions is dependent solely and simply on the contents of the actual device code store which is addressed by the working device code. The supervisory program changes the devices which are addressed by the I/O instructions by changing the contents of the actual device code store.

While the invention has been particularly shown and described with reference to a preferred embodiment, it will be understood by those skilled in the art that various changes in form and detail may be made without departing from the spirit and scope of the invention.

What is claimed is:

1. A method of controlling a plurality of I/O devices by a central processing unit comprising the steps of:
- assigning each I/O device an actual device code,
- storing in the memory of said central processing unit an actual device code corresponding to that assigned to each of said I/O devices, which are in use,
- utilizing an I/O instruction having a working device code field and a function field,
- using said working device codes contained in said I/O instruction to address said stored actual device codes in memory during I/O instruction execution to obtain an actual device code, and
- decoding by means of an address decoder said obtained actual device codes to obtain a unique input/output address register for each device.

2. The method of claim 1, further wherein, said actual device codes obtained from said store of actual device codes are further output to said I/O devices which compare the said output actual device codes with their assigned actual codes and in the event that a comparison is made respond to the function designated by said I/O instruction.

3. The method of claim 2, further wherein a supervisory program is operative to selectively change the actual device codes assigned to each of said working device codes.

4. The method of claim 2, further wherein each of said I/O devices is assigned a unique interrupt request line which is activated when a device requires servicing.

5. The method of claim 4, further wherein activation of said interrupt request lines by said devices causes, by means of a matrix, the selection of the same input/output address register which would be selected if said actual device code from said device were input to said decoder.

6. The method of claim 5, further wherein when several I/O devices activate their said assigned interrupt request lines simultaneously the device having highest priority is selected by said matrix.

7. The method of claim 6, further wherein the output of said matrix which is indicative of the highest priority order I/O device is applied to a device code encoder which outputs a code corresponding to the code assigned the device selected to a device code buss which is then transmitted to said I/O devices for determination of which device was selected by said matrix.

8. The method of claim 7, further wherein a supervisory program is operative to selectively change the actual device codes assigned to one or more of said working device codes.

9. A data processing system having an I/O instruction including a working device code field comprising:
- a plurality of input/output devices each including a unique actual device code and a comparator adapted to receive said actual device code,
- a central processing unit connected to each of said I/O devices by a device code buss, and an interrupt request line for each of said I/O devices,
- said central processing unit including an actual device code store storing actual device codes in locations which are addressed by said working device codes;
  - an input/output address register store (I/OAR) storing addresses of storage locations in memory to be utilized by said devices,
  - means for obtaining the actual device code from said actual device code store designated by said working device code field of said I/O instruction and for outputting said obtained actual device codes along said device code buss to said I/O devices, and
  - an address decoder also receptive of said actual device codes output to said I/O devices for selecting the unique input/output address register from said input/output address register store for use by the device corresponding to said output actual device code.

10. The system of claim 9, further wherein said system further includes a full matrix connected to each of said interrupt request lines of said input/output devices, said full matrix having its output connected to said I/OAR store so as to address said I/OAR store in accordance with the output from said full matrix.

11. The system of claim 10 wherein said full matrix further includes a priority determination means such that when several I/O devices simultaneously request service, said full matrix provides an address to said I/OAR store in accordance with the device having highest order priority.

12. The system of claim 11 wherein said central processing unit further includes a device code encoder connected to the output of said full matrix operative to provide an output code to said device code buss in accordance with the output of said full matrix which output from said device code encoder is applied to all of said I/O devices to indicate to said devices which device requesting service was selected by said full matrix.

13. The system of claim 12 further wherein said actual device code store is addressed by means of a working device code field of an I/O instruction.

* * * * *